(12) United States Patent
Okamoto

(10) Patent No.: US 11,482,026 B2
(45) Date of Patent: Oct. 25, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Naoki Okamoto, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 224 days.

(21) Appl. No.: 17/024,128

(22) Filed: Sep. 17, 2020

(65) Prior Publication Data
US 2021/0224530 A1 Jul. 22, 2021

(30) Foreign Application Priority Data
Jan. 20, 2020 (JP) .............................. JP2020-007032

(51) Int. Cl.
*G06V 30/412* (2022.01)
*G06V 30/414* (2022.01)
*G06V 30/10* (2022.01)
*G06V 30/416* (2022.01)

(52) U.S. Cl.
CPC .......... *G06V 30/412* (2022.01); *G06V 30/414* (2022.01); *G06V 30/416* (2022.01); *G06V 30/10* (2022.01)

(58) Field of Classification Search
CPC .... G06V 30/10; G06V 30/416; G06V 30/414; G06V 30/412
See application file for complete search history.

(56) References Cited

U.S. PATENT DOCUMENTS
2018/0039847 A1* 2/2018 Nishio ................. G06V 30/153

FOREIGN PATENT DOCUMENTS
JP     H5-266247 A    10/1993

* cited by examiner

Primary Examiner — King Y Poon
Assistant Examiner — Michael L Burleson
(74) Attorney, Agent, or Firm — Oliff PLC

(57) ABSTRACT

Information processing apparatus including a processor configured to acquire a document image representing one of multiple documents, a partial image representing a part included in the document image and having a character written in the document, and a character recognition result regarding the character. The character recognition result includes a first character recognition result regarding a first character and a second character recognition result regarding a second character. The processor is configured to display the first document image, the first character recognition result, and a first partial image associated with the first character recognition result on a document basis in a first display mode. The processor is further configured to, in a second display mode, display the second character recognition result and a second partial image associated with the second character recognition result on a basis of a character common to the multiple documents and not display the document image.

17 Claims, 9 Drawing Sheets

FIG. 4

| DOCUMENT IMAGE ID | FORM IMAGE ID | PARTIAL IMAGE ID | POSITIONAL INFORMATION | CHARACTER RECOGNITION RESULT ID |
|---|---|---|---|---|
| DOCUMENT IMAGE 151 | FORM IMAGE 141 | PARTIAL IMAGE 161 | PREPRINTED GUIDELINE 1411 | CHARACTER RECOGNITION RESULT 171 |
| | | PARTIAL IMAGE 162 | PREPRINTED GUIDELINE 1412 | CHARACTER RECOGNITION RESULT 172 |
| | | ... | ... | ... |
| DOCUMENT IMAGE 152 | FORM IMAGE 142 | ... | ... | ... |
| | | PARTIAL IMAGE 163 | PREPRINTED GUIDELINE 1421 | CHARACTER RECOGNITION RESULT 173 |
| | | ... | ... | ... |
| DOCUMENT IMAGE 153 | FORM IMAGE 143 | ... | ... | ... |
| | | PARTIAL IMAGE 164 | PREPRINTED GUIDELINE 1431 | CHARACTER RECOGNITION RESULT 174 |
| | | ... | ... | ... |

| ITEM | PARTIAL IMAGE | CHARACTER RECOGNITION RESULT |
|---|---|---|
| DEGREE OF UNDER-STANDING | 2 | 2 |
| DEGREE OF UNDER-STANDING | 2 | 2 |
| DEGREE OF UNDER-STANDING | 2 | 2 |
| ... | ... | ... |
| ... | ... | ... |

164 163 162   174 173 172

210

211   212

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-007032 filed Jan. 20, 2020.

BACKGROUND

(i) Technical Field

The present disclosure relates to an information processing apparatus and a non-transitory computer readable medium.

(ii) Related Art

There is a technology for digitizing a document. For example, Japanese Unexamined Patent Application Publication No. 5-266247 describes a data generation technology based on separation of a slip having a predetermined entry made in a form into a fixed-pattern part and an entry part.

SUMMARY

In some cases, characters included in a document image are recognized by using character recognition technology, and thereafter the character recognition result is displayed to enable a person to verify the character recognition result. Conceivable character recognition result display methods are, for example, a method in which results of the recognition of characters written in multiple respective documents are displayed on a document basis and a method in which characters written in multiple respective documents are recognized and character recognition results are collectively displayed on the basis of a character common to the multiple documents. It is known that not only each character recognition result but also the corresponding document image representing the document is displayed. However, when the character recognition results are displayed on the basis of the character common to the multiple documents, displaying not only the character recognition results but also the document images thereof requires the acquisition of the document images of the multiple respective documents and thus lowers the speed of displaying a screen.

Aspects of non-limiting embodiments of the present disclosure relate to a configuration having a first display mode and a second display mode and providing an increased speed of displaying a screen as compared with a case where in the second display mode, the results of the recognition of characters written in the multiple respective documents are displayed on the screen together with document images representing the respective documents. In the first mode, results of the recognition of the respective characters written in the documents are displayed on a document basis. In the second display mode, the results of the recognition of the characters written in the multiple respective documents are displayed on the basis of a character common to the multiple documents.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing apparatus including a processor configured to acquire a document image representing one of multiple documents, a partial image representing a part included in the document image and having a character written in the document, and a character recognition result regarding the character. The document image includes a first document image and a second document image. The partial image includes a first partial image and a second partial image. The character includes a first character included in the first document image and a second character included in the documents. The character recognition result includes a first character recognition result regarding the first character and a second character recognition result regarding the second character. The first partial image is associated with the first character recognition result. The second partial image is associated with the second character recognition result. The processor is configured to display the first document image, the first character recognition result, and the first partial image on a document basis in a first display mode. The processor is further configured to, in a second display mode, display the second character recognition result and the second partial image on a basis of a character common to the multiple documents and not display the document image.

BRIEF DESCRIPTION OF THE DRAWINGS

An exemplary embodiment of the present disclosure will be described in detail based on the following figures, wherein:

FIG. 4 is a diagram illustrating an example of a correspondence table;

FIGS. 7A, 7B, 7C are views each illustrating an example of a verification screen for a multi-document display mode.

DETAILED DESCRIPTION

1. Configuration

Figure 1:
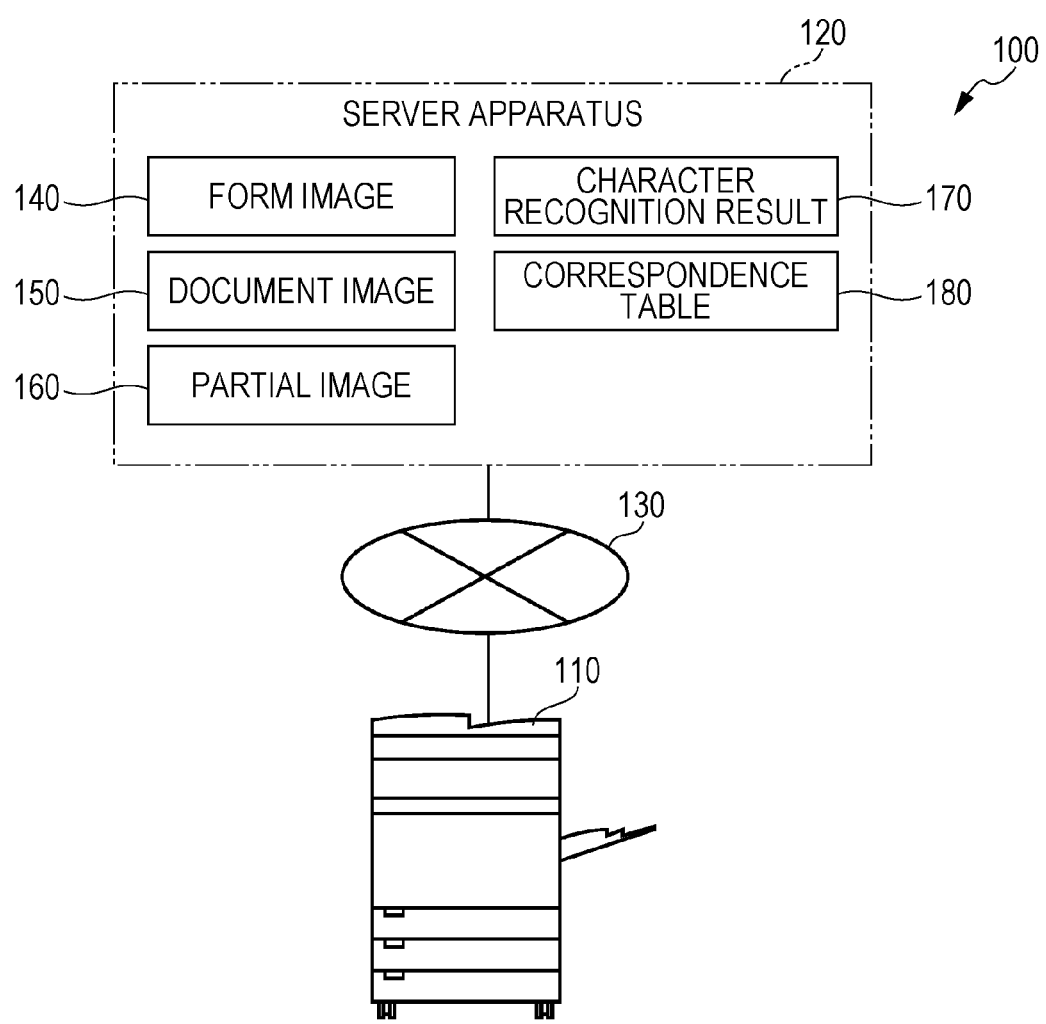
FIG. 1 is a diagram illustrating an example configuration of a character recognition system according to the exemplary embodiment.

FIG. 1 is a diagram illustrating an example configuration of a character recognition system 100 according to an exemplary embodiment. The character recognition system 100 is a system enabling a user to verify the result of the recognition of a character included in an image representing a document. In the case of a wrong character recognition result, the user may correct the character recognition result. After the verification by the user, the character recognition result may be stored. The term "character" is not limited to a character of a language and includes a numerical value and a symbol. The character recognition system 100 includes a client apparatus 110 and a server apparatus 120. These apparatuses are connected by using a communication network 130.

Figure 2:
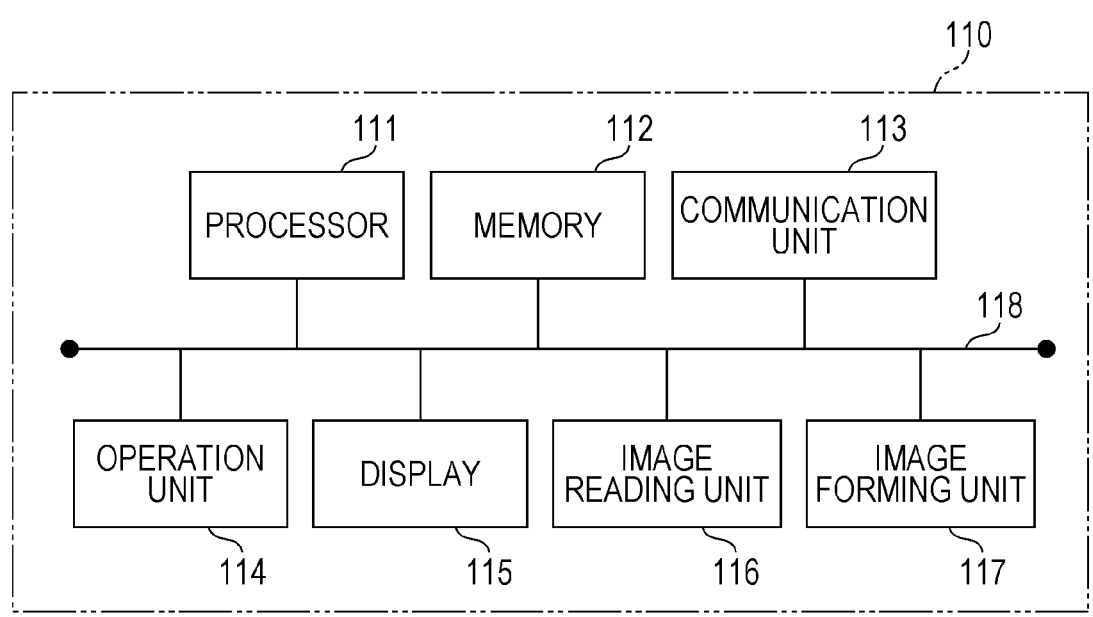
FIG. 2 is a diagram illustrating an example configuration of a client apparatus.

FIG. 2 is a diagram illustrating an example configuration of the client apparatus 110. The client apparatus 110 has multiple image processing functions such as a copying function, a printing function, a scanning function, and a faxing function. The client apparatus 110 provides the server apparatus 120 with an image obtained by scanning a document. The client apparatus 110 provides the user with the results of the recognition of characters included in the image by the server apparatus 120. The client apparatus 110 is an example of an information processing apparatus according to the present disclosure. The client apparatus 110 includes a processor 111, a memory 112, a communication unit 113, an operation unit 114, a display 115, an image reading unit 116, and an image forming unit 117. These units are connected with a bus 118 interposed therebetween.

The processor 111 runs a program and thereby controls the units of the client apparatus 110 and executes various processes. As the processor 111, for example, a central processing unit (CPU) may be used. The memory 112 stores the program run by the processor 111. As the memory 112, for example, a read only memory (ROM) and a random access memory (RAM) may be used. The memory 112 stores a program for implementing a function enabling the user to verify a character recognition result. The memory 112 may also store a web browser. In this case, data exchange may be performed between the client apparatus 110 and the server apparatus 120 via the web browser. The communication unit 113 performs data communication with a different apparatus connected with the communication network 130 interposed therebetween. The operation unit 114 is used for operations performed by the user on the client apparatus 110. For example, a touch panel and keys may be used for the operation unit 114. The display 115 displays various pieces of information. For example, a liquid crystal display may be used for the display 115. The image reading unit 116 reads an image and converts the image to image data. For example, an image scanner may be used for the image reading unit 116. The image forming unit 117 forms an image corresponding to the image data on the medium such as a sheet. For example, a printer may be used for the image forming unit 117.

The server apparatus 120 executes a character recognition process on document images 150 provided by the client apparatus 110 and provides the client apparatus 110 with the result of the character recognition. The server apparatus 120 stores form images 140, the document images 150, partial images 160, character recognition results 170, and a correspondence table 180.

Figure 3:
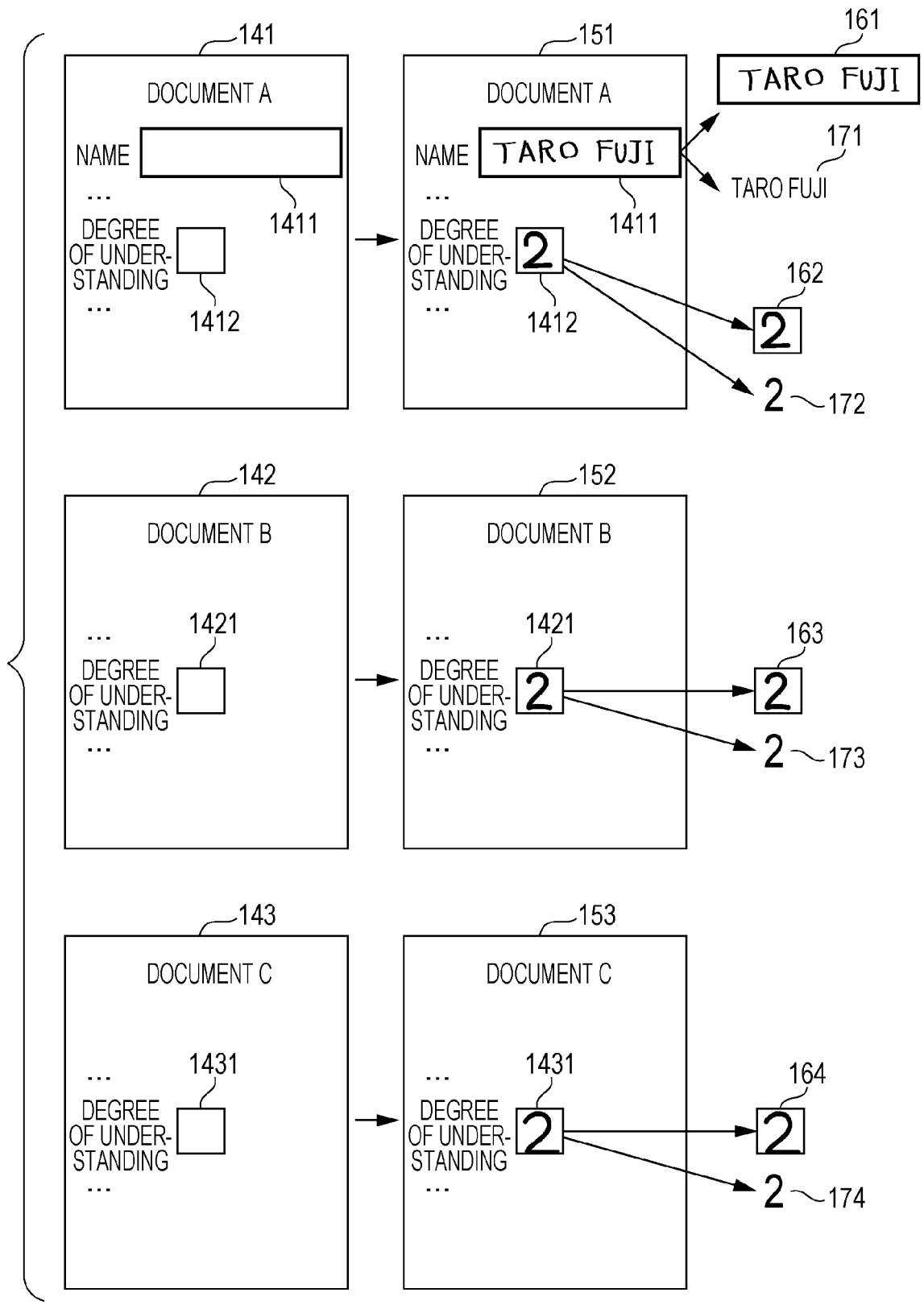
FIG. 3 is a diagram illustrating examples of a form image, a document image, a partial image, and a character recognition result.

FIG. 3 is a diagram illustrating examples of a form image 140, a document image 150, a partial image 160, and a character recognition result 170. In these examples, the form image 140 includes form images 141, 142, and 143. The form images 141 to 143 are images respectively representing the forms of documents that are Document A, Document B, and Document C. In other words, the form images 141 to 143 each represent a blank document prior to an entry of a character. These documents have respective predetermined formats. The form image 141 includes preprinted guidelines 1411 and 1412 in the respective predetermined ranges. A writer makes entries in the respective preprinted guidelines 1411 and 1412. However, the form image 141 represents a state before the writer writes characters and thus does not describe the characters in the preprinted guidelines 1411 and 1412. Likewise, the form images 142 and 143 respectively include preprinted guidelines 1421 and 1431 similar to the preprinted guideline 1412. However, the form images 142 and 143 each represent a state before a writer writes a character and thus do not describe the character in a corresponding one of the preprinted guidelines 1421 and 1431. The form image 140 is an example of a different document image according to the present disclosure.

The document image 150 includes document images 151, 152, and 153. The document images 151 to 153 respectively represent the documents "Document A" to "Document C" having characters written therein. The document images 151 to 153 may each be an image representing the entirety of the corresponding document. If the document has multiple pages, the document images 151 to 153 may be images each representing one of the pages of the document. For example, the form image 141 is formed on the sheet, and thereby a form is generated. A first writer handwrites characters in the preprinted guidelines 1411 and 1412 of the form. The form is scanned, and thereby the document image 151 is obtained. Note that the way of writing the characters is not limited to the handwriting and may be printing. Likewise, a second writer and a third writer respectively handwrite characters in the preprinted guidelines 1421 and 1431 of the respective forms generated by forming the form images 142 and 143 on the respective sheets. The forms are scanned, and thereby the document images 152 and 153 are obtained.

The partial image 160 includes partial images 161, 162, 163, and 164. The partial images 161 to 164 each represent a part having a least one written character in a corresponding one of the document images 151 to 153. The partial images 161 to 164 are each generated by cutting out the part having the written character from the corresponding one of the document images 151 to 153. For example, the partial images 161 and 162 are each generated by cutting out parts corresponding to the preprinted guidelines 1411 and 1412 from the document image 151. Likewise, the partial images 163 and 164 are respectively generated by cutting out parts corresponding to the preprinted guidelines 1421 and 1431 from the document images 152 and 153. The server apparatus 120 has a protrusion detection function of detecting protrusion of a character from the preprinted guideline. The protrusion detection function is implemented by, for example, a known method. If protrusion is detected by the protrusion detection function, the partial image 160 may be generated by cutting out the part having the character written in the document image 150 in a wider range than that of the preprinted guideline. Accordingly, when a character protrudes from the preprinted guideline, a protruding part of the character protruding from the preprinted guideline is included in the partial image 160.

The character recognition result 170 includes character recognition results 171, 172, 173, and 174. The character recognition results 171 to 174 each represent the result of the recognition of the character included in the corresponding one of the document images 151 to 153. The document images 151 to 153 undergo the character recognition process in accordance with the respective formats of the document images 151 to 153. For the character recognition process, for example, optical character recognition (OCR) may be used. For example, the character recognition results 171 and 172 are respectively obtained by recognizing the characters "TARO FUJI" and "2" written in the preprinted guidelines 1411 and 1412 of the document image 151. Likewise, the character recognition results 173 and 174 are respectively obtained by recognizing the character "2" written in the preprinted guidelines 1421 and 1431 of the respective document images 152 and 153.

FIG. 4 is a diagram illustrating an example of the correspondence table 180. The correspondence table 180 includes a document image ID, a form image ID, a partial image ID, positional information, and a character recognition result ID. The document image ID is information uniquely identifying the document image 150. The form image ID is information uniquely identifying the form image 140. The partial image ID is information uniquely identifying the partial image 160. The positional information is information indicating the position of the partial image 160 in the document image 150. For the positional information, information uniquely identifying a preprinted guideline for the partial image 160 may be used. However, the positional information is not limited to the information uniquely identifying a preprinted guideline and may be the position coordinates of the partial image 160 in the document image 150. The character recognition result ID is information uniquely identifying the character recognition result 170.

In the correspondence table 180 illustrated in FIG. 4, the document image ID of the document image 151 is associated with the form image ID of the form image 141, the partial image IDs of the partial images 161 and 162, the preprinted guideline IDs of the preprinted guidelines 1411 and 1412, and the character recognition result IDs of the character recognition results 171 and 172. This indicates the following. Specifically, the form image 141 is an image representing the document "Document A" prior to entries of the characters, the document image 151 includes the partial images 161 and 162, and the character recognition results 171 and 172 are obtained by recognizing the characters included in the document image 151. The partial image ID of the partial image 161 is associated with positional information indicating the preprinted guideline 1411. This indicates that the partial image 161 is located in the preprinted guideline 1411 in the document image 151.

The character recognition result 170 stored in the server apparatus 120 is verified by the user by using the client apparatus 110. At this time, the method for displaying the character recognition result 170 by the client apparatus 110 includes a normal display mode and a multi-document display mode.

The normal display mode is a display mode in which the character recognition result 170 is displayed on a document basis. In the normal display mode, the document image 150 representing a target document, the character recognition result 170 regarding at least one character included in the document image 150, and the partial image 160 associated with the character recognition result 170 are displayed on the document basis. The normal display mode is used, for example, to verify the consistency of the character recognition result 170 in one document. The normal display mode is an example of a first display mode according to the present disclosure. The document image 150, the character recognition result 170, and the partial image 160 that are displayed in the normal display mode are respectively examples of a first document image, a first character recognition result, and a first partial image according to the present disclosure.

The multi-document display mode is a display mode in which the multiple character recognition results 170 common to multiple documents are collectively displayed on the basis of a character common to the multiple documents. In the multi-document display mode, the character recognition results 170 regarding the characters in the multiple documents are each displayed together with the partial image 160 associated with the corresponding character recognition result 170 on the basis of a character common to the multiple documents, but basically, the document image 150 is not displayed. The common character includes, for example, a symbol indicating that verification has been performed, a symbol indicating that verification has not been performed, an identical numerical value, and an identical character. The multi-document display mode is used, for example, to quickly and efficiently verify the character recognition result 170 common to the multiple documents. The multi-document display mode is an example of a second display mode according to the present disclosure. The character recognition result 170 and the partial image 160 that are displayed in the multi-document display mode are examples of a second character recognition result and a second partial image according to the present disclosure.

2. Operation

In the description below, processing performed by the processor 111 mainly denotes processing performed in such a manner that the processor 111 performs arithmetic operations or controls the operation of a different hardware element in cooperation between programs stored in the memory 112 and the processor 111 running the programs.

Figure 5:
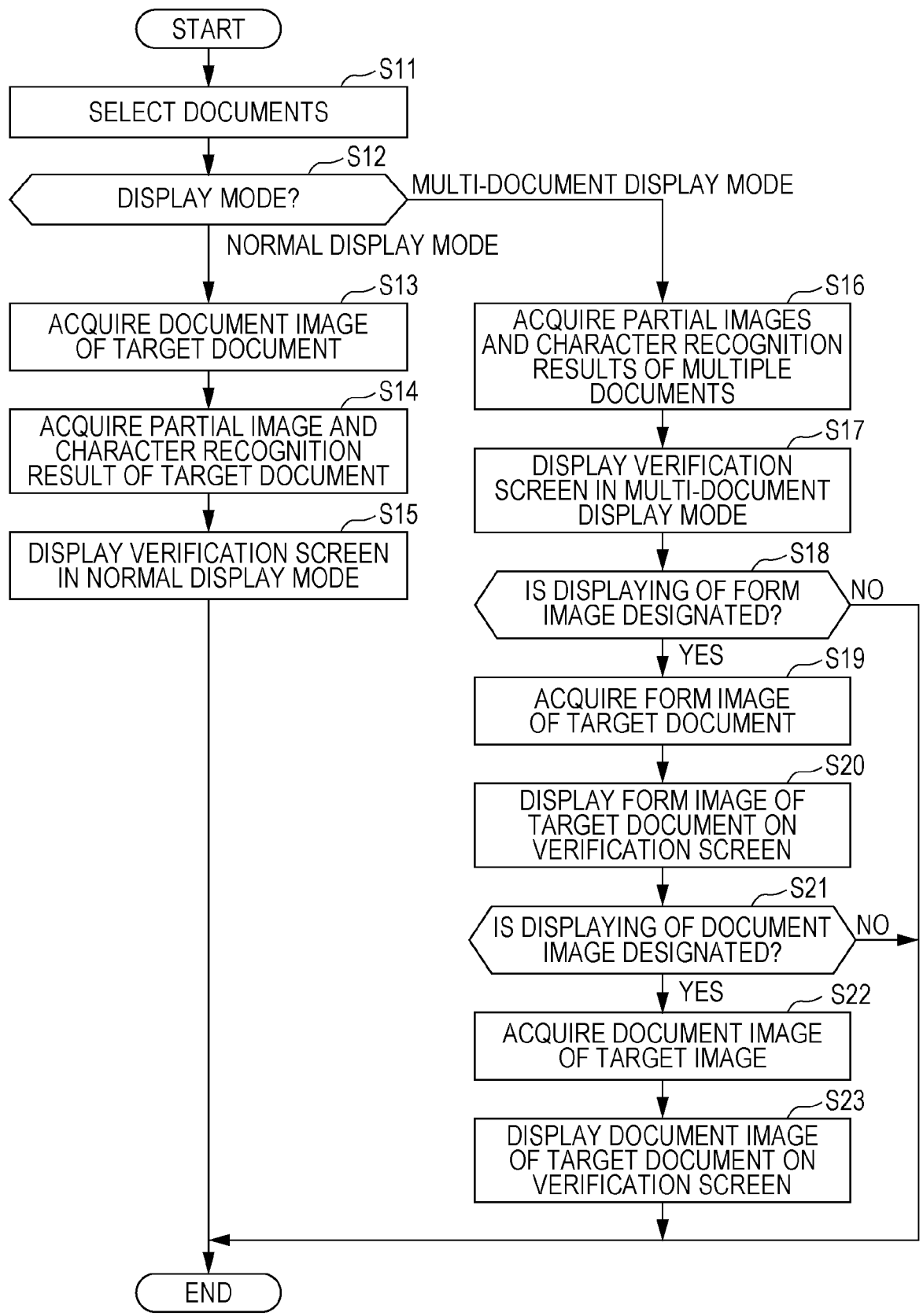
FIG. 5 is a flowchart illustrating an example of the operations of the client apparatus according to the exemplary embodiment.

FIG. 5 is a flowchart illustrating an example of the operations of the client apparatus 110 according to this exemplary embodiment. The operation is performed when the user verifies the character recognition results 170 stored in the server apparatus 120.

In step S11, the processor 111 selects multiple documents in accordance with an operation performed by the user. For example, to verify the character recognition results 170 for the characters included in the documents "Document A" to "Document C" illustrated in FIG. 3, the user performs an operation for selecting the documents "Document A" to "Document C" by using the operation unit 114. In accordance with this operation, the documents "Document A" to "Document C" are selected.

In step S12, in accordance with an operation by the user, the processor 111 selects whether the character recognition results 170 are to be displayed in the normal display mode or in the multi-document display mode. For example, if the user performs an operation for selecting the normal display mode by using the operation unit 114, the normal display mode is selected in accordance with the operation. In this case, the determination result in step S12 is the normal display mode, and the processing proceeds to step S13.

In step S13, the processor 111 acquires the document image 150 of the target document from the server apparatus 120. The target document is one of the multiple documents selected in step S11. For example, the target document may be the first one of the documents selected in step S11 or may be a document selected in accordance with an operation by the user from the multiple documents selected in step S11. Specifically, the processor 111 transmits, from the communication unit 113 to the server apparatus 120, a request for acquiring the document image 150 of the target document. The server apparatus 120 transmits the document image 150 to the client apparatus 110 in response to the acquisition request. The processor 111 receives the document image 150 transmitted from the server apparatus 120 at the communication unit 113.

In step S14, the processor 111 acquires the partial image 160 and the character recognition result 170 regarding the target document from the server apparatus 120. Specifically, processor 111 transmits, from the communication unit 113 to the server apparatus 120, a request for acquiring the partial image 160 and the character recognition result 170 regarding the target document. The server apparatus 120 transmits the partial image 160 and the character recognition result 170 to the client apparatus 110 in response to the acquisition request. The processor 111 receives the partial image 160 and the character recognition result 170 transmitted from the server apparatus 120 at the communication unit 113. The target document is herein the document "Document A" illustrated in FIG. 3. In the correspondence table 180 illustrated in FIG. 4, the document image ID of the document image 151 representing the document "Document A" is associated with the partial image IDs of the partial images 161 and 162 and the character recognition result IDs of the character recognition results 171 and 172. In this case, the partial images 161 and 162 and the character recognition results 171 and 172 are acquired.

In step S15, the processor 111 displays a verification screen 200 in the normal display mode on the display 115 on the basis of the document image 150, the partial image 160, and the character recognition result 170 regarding the target document acquired in steps S13 and S14.

Figure 6:
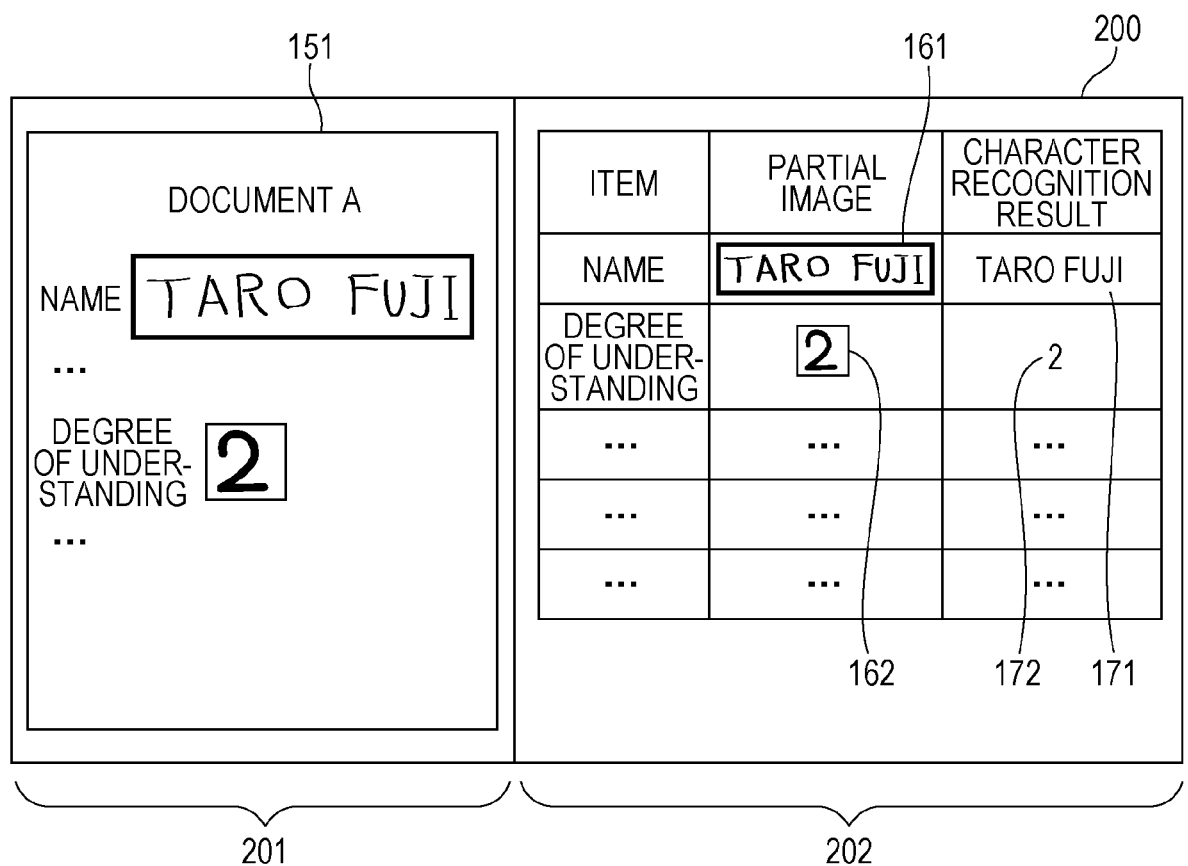
FIG. 6 is a view illustrating an example of a verification screen for a normal display mode.

FIG. 6 is a view illustrating an example of the verification screen 200 in the normal display mode. In this case, the document image 151 is acquired in step S13, and the partial images 161 and 162 and the character recognition results 171 and 172 are acquired in step S14. The verification screen 200 is divided into a pane 201 and a pane 202. The document image 151 is displayed in the pane 201. In the pane 202, the partial image 161, the character recognition result 171, the partial image 162, and the character recognition result 172 are displayed at the respective positions. The user looks at the verification screen 200 and verifies the character recognition results 171 and 172 regarding the characters included in the document image 151 in such a manner as to refer to the entire document image 151 of the document "Document A" and to make a comparison with the partial images 161 and 162 respectively representing the parts where the characters are written.

For example, if the user performs an operation for changing the target document from the document "Document A" to a different document by using the operation unit 114 after the verification screen 200 illustrated in FIG. 6 is displayed, step S13 and subsequent steps may be performed on the changed document.

In contrast, for example, if the user performs an operation for selecting the multi-document display mode by using the operation unit 114 in step S12 described above, the multi-document display mode is selected in accordance with the operation. In this case, the determination result in step S12 is the multi-document display mode, and the processing proceeds to step S16. At this time, the user performs an operation for setting a displaying condition by using the operation unit 114. For example, if the user wishes to verify only the results of character recognition of the character "2", a displaying condition indicating the inclusion of the character "2" is set.

In step S16, the processor 111 acquires, from the server apparatus 120, the partial image 160 and the character recognition result 170 that correspond to any of the multiple documents selected in step S11 and satisfy the displaying condition. A specific acquisition method is the same as that in step S14 described above. In this case, the displaying condition indicating that the documents selected in step S11 are the documents "Document A" to "Document C" and that the character "2" is included is set. In the correspondence table 180 illustrated in FIG. 4, the document image IDs of the document images 151 to 153 representing the documents "Document A" to "Document C" are associated with the character recognition result IDs of the character recognition results 171 to 174 and the partial image IDs of the partial images 161 to 164. In addition, as illustrated in FIG. 3, the character recognition result 171 does not include the character "2", and the character recognition results 172 to 174 include the character "2". Further, in the correspondence table 180 illustrated in FIG. 4, the character recognition result IDs of the character recognition results 172 to 174 are associated with the partial image IDs of the partial images 162 to 164. In this case, the character recognition results 172 to 174 and the partial images 162 to 164 are acquired.

In step S17, the processor 111 displays a verification screen 210 in the multi-document display mode on the display 115 on the basis of the partial image 160 and the character recognition result 170 that are acquired in step S16. At this time, the processor 111 does not display the document image 150, unlike the verification screen 200 illustrated in FIG. 6.

Figure 7B:
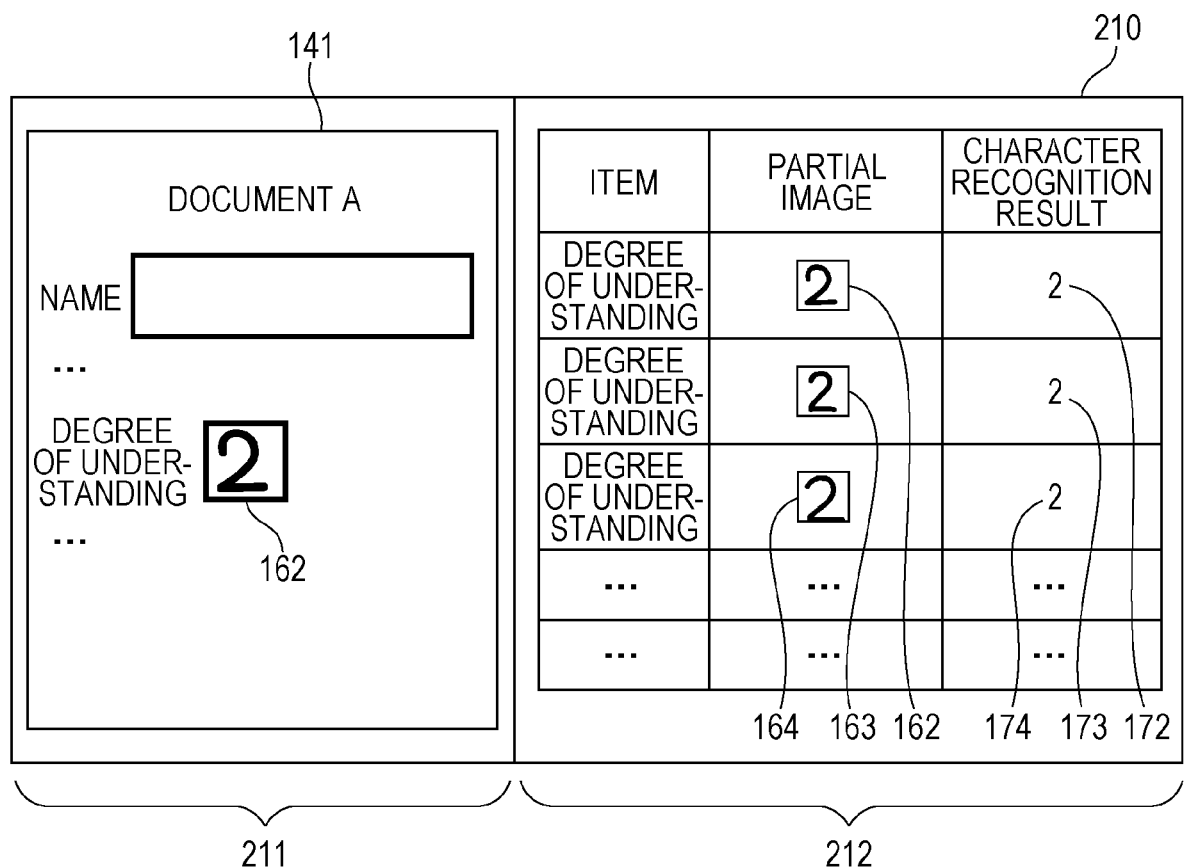
Figure 7C:
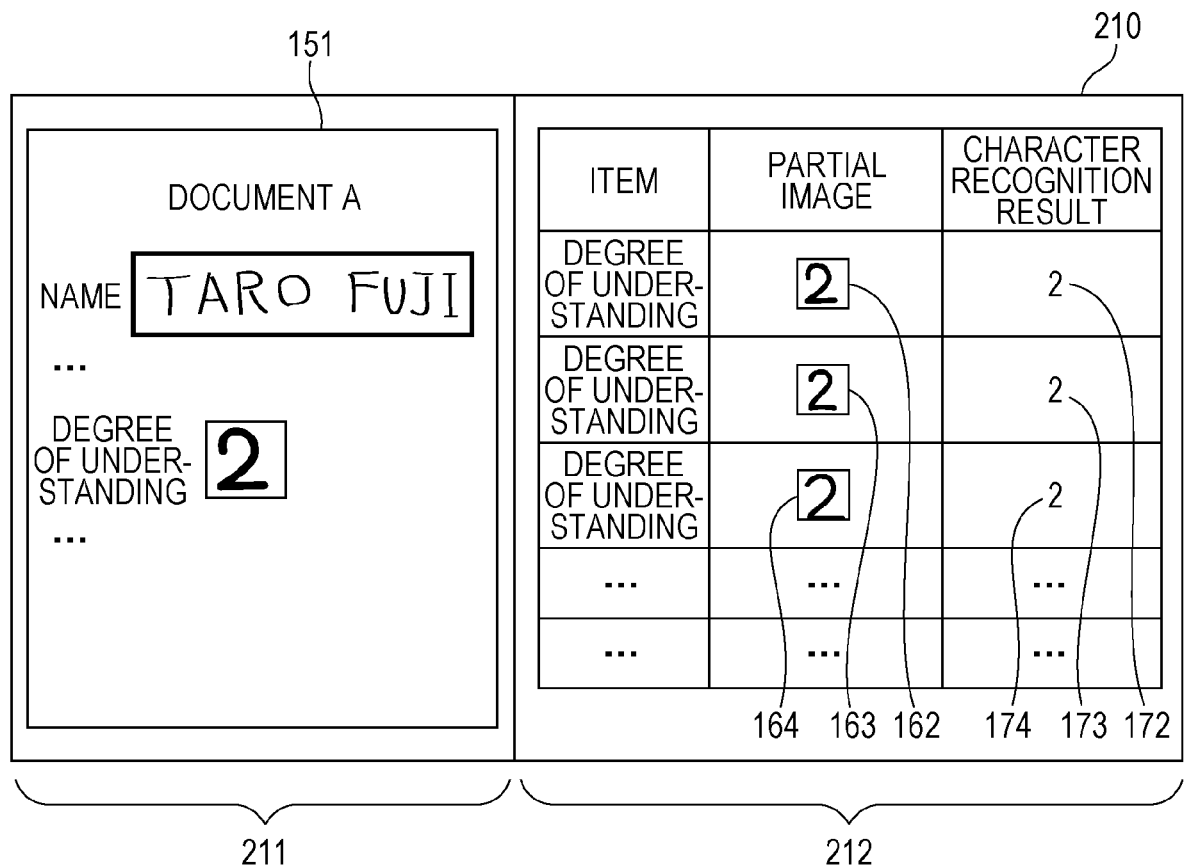

FIGS. 7A, 7B, and 7C are views each illustrating an example of the verification screen 210 in the multi-document display mode. In this case, the character recognition results 172 to 174 and the partial images 162 to 164 are acquired in step S16. In step S17, the verification screen 210 illustrated in FIG. 7A is displayed. The verification screen 210 is divided into a pane 211 and a pane 212. In the verification screen 210 illustrated in FIG. 7A, any image is not in the pane 211. In the pane 212, the partial image 162, the character recognition result 172, the partial image 163, the character recognition result 173, the partial image 164, and the character recognition result 174 that are acquired in step S16 are displayed at the respective positions. The character recognition results 172 to 174 each indicate the result of the recognition of the character "2". The user looks at the verification screen 210 and thereby verifies the character recognition results 172 to 174 in such a manner as to make a comparison with the partial images 162 to 164 respectively representing the parts where the character "2" included in the documents "Document A" to "Document C" is written.

In step S18, the processor 111 determines whether the displaying of the form image 140 is designated. For example, if the user performs an operation for selecting any of the partial images 160 by using the operation unit 114 on the verification screen 210 displayed in step S17, it is determined that the displaying of the form image 140 of the target document associated with the selected partial image 160 is designated. For example, if a wrong character recognition result 172 on the verification screen 210 illustrated in FIG. 7A is found and thus leads to the need for verifying descriptions around the character recognition result 172, the user may perform an operation for selecting the partial image 162. The operation for selecting the partial image 162 may be, for example, an operation for selecting a range including the partial image 162 and the character recognition result 172. If the displaying of the form image 140 is not designated, the determination result in step S18 is NO, and then the processing is terminated. In contrast, if the displaying of the form image 140 is designated, the determination result in step S18 is YES, and the processing proceeds to step S19.

In step S19, the processor 111 acquires, from the server apparatus 120, the form image 140 and the positional information regarding the selected partial image 160 of the target document. Specifically, the processor 111 transmits, from the communication unit 113 to the server apparatus 120, a request for acquiring the form image 140 of the target document and the positional information regarding the selected partial image 160. The server apparatus 120 transmits the form image 140 and the positional information to the client apparatus 110 in response to the acquisition request. The processor 111 receives the form image 140 transmitted from the server apparatus 120 and the positional information at the communication unit 113. In this case, an operation for selecting the partial image 162 is performed on the verification screen 210 illustrated in 7A. In this case, the document "Document A" is the target document. In the correspondence table 180 illustrated in FIG. 4, the partial image ID of the partial image 162 is associated with the form image ID of the form image 141 and the positional information indicating the preprinted guideline 1412. In this case, the form image 141 and the positional information indicating the preprinted guideline 1412 are acquired.

In step S20, the processor 111 displays the form image 140 of the target document on the verification screen 210. At this time, in the displaying, the processor 111 superimposes the target partial image 160 on the form image 140 of the target document on the basis of the positional information acquired in step S19. In this case, as illustrated in FIG. 7B, the form image 141 representing the state of the document "Document A" prior to the entries of the characters is displayed in the pane 211 of the verification screen 210. In the displaying of the form image 141, the partial image 162 is superimposed on the preprinted guideline 1412 at the position indicated by the positional information regarding the preprinted guideline 1412. In other words, mapping of the partial image 162 on the form image 141 is performed in accordance with the positional information, and the partial image 162 is displayed in the form image 141. The user looks at the verification screen 210 and thereby verifies the character recognition result 172 representing the character "2" in such a manner as to refer to the form image 141 of the document "Document A" and the partial image 162 representing the part where the character is written in the document. Note that the document image 150 is not displayed in the verification screen 210 illustrated in FIGS. 7A and 7B. Since the verification screen 210 displayed in the multi-document display mode is used to quickly and efficiently verify the character recognition result 170 common to the multiple documents, it is thus considered that the document image 150 does not have to be displayed.

In step S21, the processor 111 determines whether the displaying of the document image 150 of the target document is designated. For example, if the user performs an operation for selecting the partial image 160 included in the pane 211 on the verification screen 210 displayed in step S20 by using the operation unit 114, it is determined that the displaying of the document image 150 of the target document is designated. For example, if an error is considered to have occurred on the character recognition result 172 because a character protrudes from the preprinted guideline to a large degree on the verification screen 210 illustrated in 7B, it is considered to be desirable to look at the entire document image 151 representing the target document to correct the character recognition result 172. In the case as described above, an operation for selecting the partial image 162 included in the pane 211 may be performed on the verification screen 210 illustrated in 7B. If the displaying of the document image 150 is not designated, the determination result in step S21 is NO, and then the processing is terminated. In contrast, if the displaying of the document image 150 is designated, the determination result in step S21 is YES, and the processing proceeds to step S22.

In step S22, the processor 111 acquires the document image 150 of the target document from the server apparatus 120. A specific acquisition method is the same as that in step S13 described above. In this case, the partial image 162 included in the pane 211 is selected on the verification screen 210 illustrated in 7B. In the correspondence table 180 illustrated in FIG. 4, the partial image ID of the partial image 162 is associated with the document image ID of the document image 151. In this case, the document image 151 is acquired.

In step S23, the processor 111 displays the document image 150 acquired in step S22 on the verification screen 210. The document image 150 is an example of a second document image according to the present disclosure. In this case, the document image 151 is acquired in step S22. In this case, as illustrated in FIG. 7C, the document image 151 is displayed in the pane 211 of the verification screen 210, instead of the form image 141 and the partial image 162 illustrated in 7B. The user looks at the verification screen 210 and verifies the character recognition result 172 regarding the character "2" included in the document in such a manner as to refer to the entire document image 151 representing the document "Document A".

If the user performs an operation for changing the displaying condition after the verification screen 210 illustrated in at least one of FIGS. 7A to 7C is displayed, step S16 and the subsequent steps may be performed in accordance with the changed displaying condition. If the user performs an operation for selecting a different one of the partial images 160 included in the verification screen 210 on the verification screen 210 illustrated in FIG. 7B, a document associated with the different partial image 160 becomes a target document, and step S19 and the subsequent steps may be performed on the new target document.

According to the exemplary embodiment described above, in the multi-document display mode, the partial image 160 and the character recognition result 170 are acquired, but the document image 150 is not acquired unless otherwise requested by the user. Time taken to acquire data from the server apparatus 120 is thus reduced as compared with the normal display mode. In addition, in the multi-document display mode, the document image 150 is not displayed unless otherwise requested by the user, the amount of data required for the displaying and the amount of the drawing the verification screen 210 are reduced as compared with the normal display mode. The speed of displaying the verification screen 210 is thus increased in the multi-document display mode as compared with a case where the results of the recognition of the characters written in the multiple respective documents are displayed together with the document images 150 representing the documents on the verification screen 210. As the result, the operability for the user is improved.

Further, the form image 140 and the partial image 160 superimposed on the form image 140 are displayed in accordance with the operation by the user in the multi-document display mode, and thus the content of the target document is verified together with the format of the target document, as occasion demands. Further, the document image 150 instead of the form image 140 is displayed in accordance with the operation by the user in the multi-document display mode, and thus the document image 150 representing a document having a written character is verified instead of the form image 140 representing the document without the written character, as occasion demands.

3. Modifications

The exemplary embodiment described above is an example of the present disclosure. The present disclosure is not limited to the exemplary embodiment above. The exemplary embodiment above may be implemented after being modified as in the following examples. At this time, two or more modifications below may be used in combination.

In the exemplary embodiment above, if the multi-document display mode is selected, and if any of the documents selected in step S11 includes a character satisfying the displaying condition and protruding from the preprinted guideline, the form image 140 of the document and the partial image 160 including the protruding character may be displayed in the pane 211 of the verification screen 210 without an operation by the user. For example, if the character "2" written in the document "Document A" protrudes from the preprinted guideline 1412, the form image 141 of the document may be acquired, and the form image 141 and the partial image 162 including the character may be displayed in the pane 211 of the verification screen 210 without an operation by the user. At this time, the partial image 162 may be generated in such a manner as to be cut out in a wider range than that of the preprinted guideline 1412. In addition, in this case, steps S17 and S18 above do not have to be performed. According to this modification, the character protruding from the preprinted guideline is verified together with the format of the document having the character written therein.

In the exemplary embodiment above, if the multi-document display mode is selected, the partial image 160 is displayed in such a manner as to be superimposed on the form image 140. However, the partial image 160 does not have to be necessarily displayed simultaneously with the form image 140. For example, the form image 140 may be displayed first, and then the partial image 160 may be displayed on the form image 140 in accordance with the operation by the user. In addition, if the user performs an operation for selecting one of the partial images 160 on the verification screen 210, and if a character corresponding to the selected partial image 160 protrudes from the preprinted guideline, the partial image 160 may be displayed on the form image 140. That is, if the user performs the operation for selecting the partial image 160 on the verification screen 210, but if the character corresponding to the selected partial image 160 does not protrude from the preprinted guideline, the partial image 160 does not have to be displayed on the form image 140.

In the exemplary embodiment above, if the multi-document display mode is selected, and if the character recognition result 170 does not satisfy a predetermined condition indicating that the character recognition is successfully performed, the document image 150 may be displayed in the pane 211 of the verification screen 210 without an operation by the user. For example, if the number of characters protruding from the respective preprinted guidelines or the number of unrecognized characters in the multiple documents selected in step S11 above is greater than or equal to a threshold, it is determined that the character recognition result 170 does not satisfy the condition, the document image 150 representing a one of these documents that is associated with the character recognition result 170 may be displayed in the pane 211 of the verification screen 210 without an operation by the user. The threshold is set as, for example, the minimum value of values representing unsuccessfully performed character recognition. In this case, steps S17 to S21 above do not have to be performed. According to this modification, for example, in a case where the character recognition result 170 does not satisfy the predetermined condition in the multi-document display mode such as a case where the number of character recognition results 170 not satisfying the predetermined condition is greater than or equal to a threshold, the document image 150 representing the document having the written character is verified.

In the exemplary embodiment above, if the target document has multiple pages, only the document image 150 representing the first page of the target document may be acquired in step S13 or S22. In this case, the document image 150 representing a page other than the first page of the target document may be acquired and displayed, for example, in accordance with an operation by the user. Likewise, only the form image 140 representing the first page of the target document may be acquired in step S19. The form image 140 representing a page other than the first page of the target document may be acquired and displayed, for example, in accordance with an operation by the user.

In the exemplary embodiment above, only one of the verification screen 210 illustrated in FIG. 7A and the verification screen 210 illustrated in FIG. 7B may be displayed. The verification screen 210 illustrated in FIG. 7C does not have to be necessarily displayed.

In the exemplary embodiment, the partial image 160 may be combined with the form image 140 at the position indicated by the positional information regarding the partial image 160. In this case, the combination processing may be performed by the client apparatus 110 or the server apparatus 120.

In the exemplary embodiment, the client apparatus 110 does not necessarily have to have the scanning function. For example, the client apparatus 110 may be a computer that displays information acquired from the server apparatus 120. In this case, scanning of a document may be performed by an image reading apparatus different from the client apparatus 110.

In the embodiment above, the term "processor" refers to hardware in a broad sense. Examples of the processor include general processors (e.g., CPU: Central Processing Unit), and dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

In the exemplary embodiment, what performs the processing mainly in the character recognition system 100 is not limited to the example described in the exemplary embodiment. For example, at least part of processing performed by the client apparatus 110 may be performed by a different apparatus.

The present disclosure may be provided as a program run by the client apparatus 110. The client apparatus 110 is an example of a computer according to the present disclosure. The program may be downloaded via a communication network such as the Internet or may be provided in such a manner as to be recorded in a computer-readable recording medium such as a magnetic recording medium (such as a magnetic tape or a magnetic disk), an optical recording medium (such as an optical disk), a magneto-optical recording medium, or a semiconductor memory.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to
acquire a document image representing one of a plurality of documents, a partial image representing a part included in the document image and having a character written in the document, and a character recognition result regarding the character, the document image including a first document image and a second document image, the partial image including a first partial image and a second partial image, the character including a first character included in the first document image and a second character included in the documents, the character recognition result including a first character recognition result regarding the first character and a second character recognition result regarding the second character, the first partial image being associated with the first character recognition result, the second partial image being associated with the second character recognition result,
display the first document image, the first character recognition result, and the first partial image on a document basis in a first display mode, and
in a second display mode, display the second character recognition result and the second partial image on a basis of a character common to the plurality of documents and not display the document image.

2. The information processing apparatus according to claim 1,
wherein in the second display mode, the processor further displays a different document image of the document in a state before the second character is written.

3. The information processing apparatus according to claim 2,
wherein in the second display mode, the processor displays the different document image in accordance with an operation by a user.

4. The information processing apparatus according to claim 2,
wherein the processor displays the second partial image in the different document image.

5. The information processing apparatus according to claim 3,
wherein the processor displays the second partial image in the different document image.

6. The information processing apparatus according to claim 4,
wherein the processor displays the second partial image in the different document image in accordance with an operation by a user.

7. The information processing apparatus according to claim 4,
wherein if the second character includes a character protruding from a predetermined range, the processor displays the second partial image including the protruding character.

8. The information processing apparatus according to claim 1,
wherein if the second character recognition result does not satisfy a predetermined condition, the processor displays the second document image representing the document having the second character written in the document.

9. The information processing apparatus according to claim 2,
wherein if the second character recognition result does not satisfy a predetermined condition, the processor displays the second document image representing the document having the second character written in the document.

10. The information processing apparatus according to claim 3,
wherein if the second character recognition result does not satisfy a predetermined condition, the processor displays the second document image representing the document having the second character written in the document.

11. The information processing apparatus according to claim 4,
wherein if the second character recognition result does not satisfy a predetermined condition, the processor displays the second document image representing the document having the second character written in the document.

12. The information processing apparatus according to claim 5,
wherein if the second character recognition result does not satisfy a predetermined condition, the processor displays the second document image representing the document having the second character written in the document.

13. The information processing apparatus according to claim 6,
wherein if the second character recognition result does not satisfy a predetermined condition, the processor displays the second document image representing the document having the second character written in the document.

14. The information processing apparatus according to claim 7,
wherein if the second character recognition result does not satisfy a predetermined condition, the processor displays the second document image representing the document having the second character written in the document.

15. The information processing apparatus according to claim 8,
wherein if a character recognition result corresponding to the second character recognition result does not satisfy the predetermined condition, and if a count of the character recognition result is greater than or equal to a threshold, the processor displays the second document image.

16. A non-transitory computer readable medium storing a program causing a computer to execute a process comprising:
acquiring a document image representing one of a plurality of documents, a partial image representing a part included in the document image and having a character written in the document, and a character recognition result regarding the character, the document image including a first document image and a second document image, the partial image including a first partial image and a second partial image, the character including a first character included in the first document image and a second character included in the documents, the character recognition result including a first character recognition result regarding the first character and a second character recognition result regarding the second character, the first partial image being associated with the first character recognition result, the second partial image being associated with the second character recognition result;

displaying the first document image, the first character recognition result, and the first partial image on a document basis in a first display mode; and in a second display mode, displaying the second character recognition result and the second partial image on a basis of a character common to the plurality of documents and not displaying the document image.

17. An information processing apparatus comprising:

means for acquiring a document image representing one of a plurality of documents, a partial image representing a part included in the document image and having a character written in the document, and a character recognition result regarding the character, the document image including a first document image and a second document image, the partial image including a first partial image and a second partial image, the character including a first character included in the first document image and a second character included in the documents, the character recognition result including a first character recognition result regarding the first character and a second character recognition result regarding the second character, the first partial image being associated with the first character recognition result, the second partial image being associated with the second character recognition result, means for displaying the first document image, the first character recognition result, and the first partial image on a document basis in a first display mode, and means for, in a second display mode, displaying the second character recognition result and the second partial image on a basis of a character common to the plurality of documents and not displaying the document image.

\* \* \* \* \*